Figure 1:
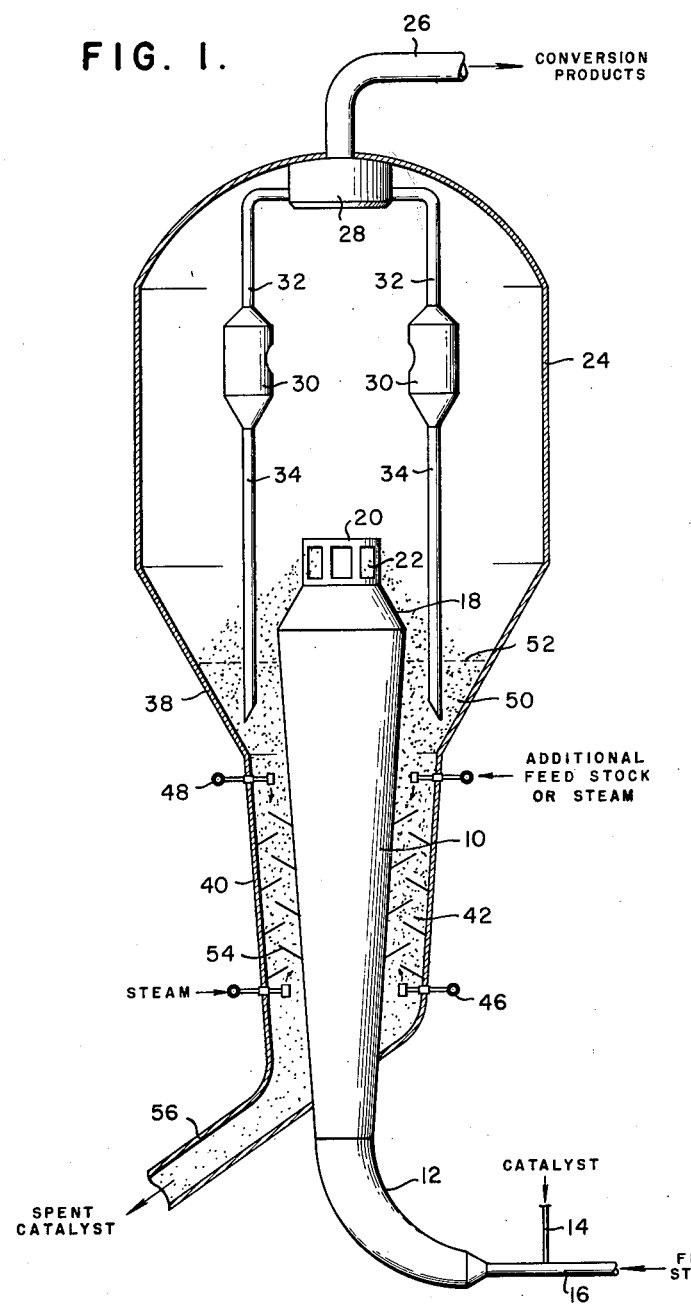

March 3, 1964  J. S. PALMER ETAL  3,123,547
FLUIDIZED CATALYTIC CRACKING PROCESS
Filed April 21, 1958  2 Sheets-Sheet 1

INVENTORS.
JEWELL S. PALMER,
WILLIAM. K. ROQUEMORE,
BY
ATTORNEY.

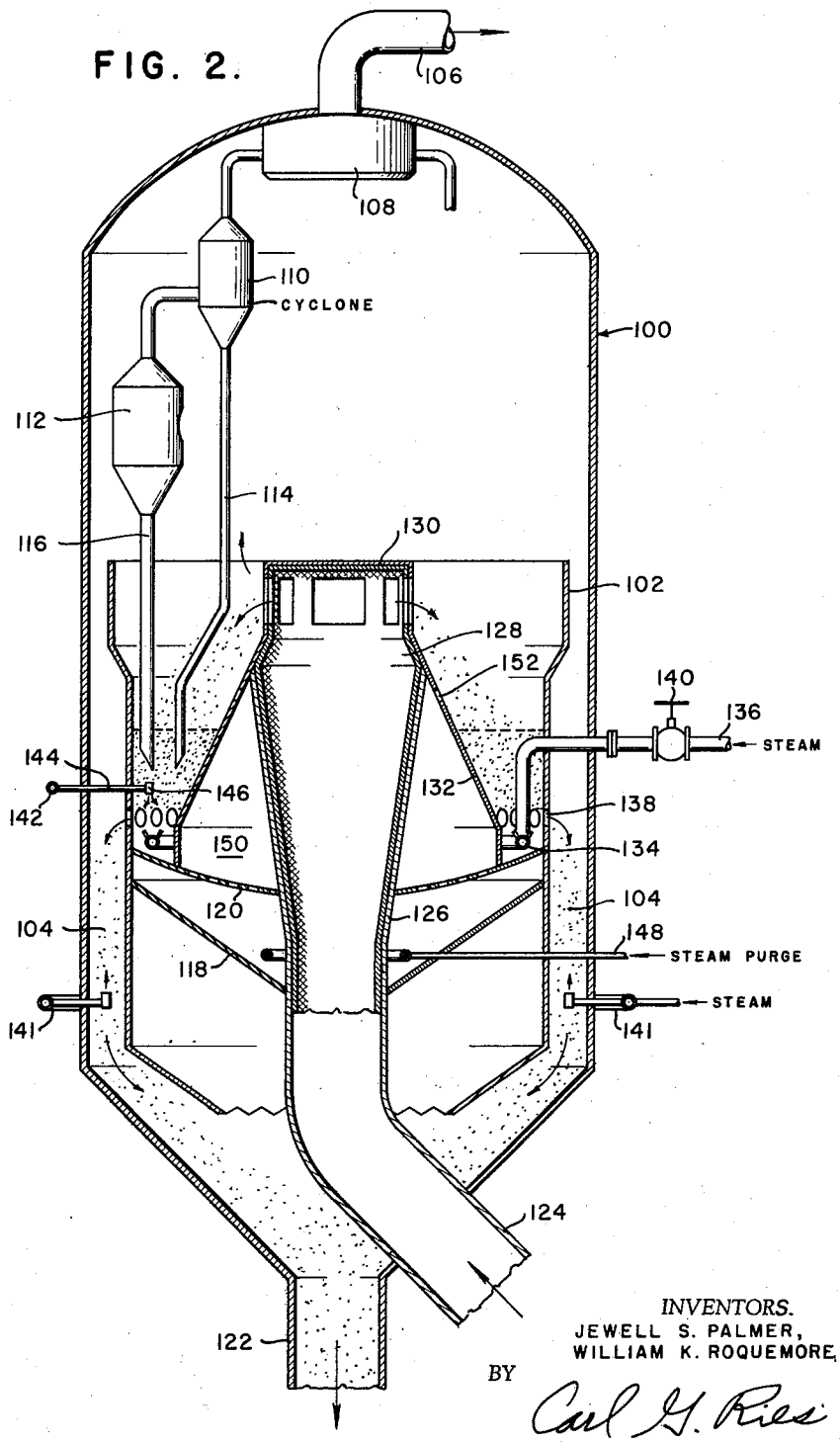

United States Patent Office 3,123,547
Patented Mar. 3, 1964

3,123,547
FLUIDIZED CATALYTIC CRACKING PROCESS
Jewell S. Palmer and William K. Roquemore, Baytown, Tex., assignors, by mesne assignments, to Esso Research and Engineering Company, Elizabeth, N.J., a corporation of Delaware
Filed Apr. 21, 1958, Ser. No. 729,645
8 Claims. (Cl. 208—78)

This invention relates to an improved fluidized catalytic cracking process and to an improved apparatus for conducting the same.

Petroleum hydrocarbon fractions boiling within the gas oil range (e.g., 600° to 1100° F.) may be advantageously converted to lower boiling more valuable hydrocarbon products by means of a fluidized catalytic cracking reaction employing a suitable cracking catalyst such as a silica-alumina catalyst, a silica-magnesia catalyst, a silica-zirconia catalyst, etc.

However, fluidized catalytic cracking has not been entirely satisfactory. Thus, for example, comparatively large amounts of hydrogen are produced and this necessitates the provision of recovery facilities constructed to process large quantities of gas. As another example, an undesirable by-product of the catalytic cracking reaction is a high molecular weight, highly aromatic fraction boiling above the boiling range of the feed (hereinafter referred to as a residuum fraction).

Fluidized catalytic cracking units, in order to be economically operated, must be constructed so as to process comparatively large volumes of feed stock (e.g., 30,000 to 60,000 barrels of feed per calendar day). The cost of construction of such facilities is measured in terms of millions of dollars. Therefore, improvements in fluidized catalytic cracking processes are eagerly sought. However, knowledge of the mechanics of fluidized flow and of the effect of changes in the pattern of fluidized flow on the efficiency of catalytic cracking are largely empirical. Still further, even when improvements in a fluidized catalytic process are developed, a problem is encountered with respect to existing fluidized catalytic cracking units in that such units are of a comparatively inflexible design and are therefore normally modified only at great cost.

In accordance with one aspect of the present invention, an improved reactor for the disperse phase fluidized catalytic cracking of petroleum hydrocarbons is provided. In accordance with another aspect of the present invention, an improved disperse phase method for the fluidized catalytic cracking of petroleum hydrocarbon fractions boiling within the gas oil boiling range is provided which is characterized by substantial reductions in carbon formation, hydrogen formation, and residuum formation.

Briefly, there is provided a reaction zone having a conically diverging end segment, such end segment having an angle of divergence within the range of about 2° to 5° and a length-to-average diameter ratio within the range of about 4:1 to 8:1. Thus, the conversion zone may consist of a conically diverging reactor or may comprise an initial tubular (i.e., transfer line) segment and a terminal conical segment. It has been further discovered that the conversion conditions to be employed in catalytically cracking a disperse phase suspension of cracking catalyst in vaporized hydrocarbons in the conical section should include an inlet superficial gas velocity to the conical section within the range of about 20 to 50 feet per second and an outlet superficial gas velocity within the range of about 8 to 15 feet per second, a temperature within the range of 800° to 1100° F., and a pressure within the range of about 0 to 50 p.s.i.g. There should be maintained in the suspension an amount of catalyst sufficient to provide from about 20 to about 300 pounds of feed per hour per pound of catalyst and the disperse phase suspension should have a catalyst to oil ratio within the range of about 2 to 15 pounds of catalyst per pound of oil. When this is done, a reduced yield of residuum and of hydrogen is obtained for a given percent of conversion of the feed stock to high octane gasoline boiling range products. There is also an enhanced yield of normally gaseous olefins.

After the suspension has passed through the conical reaction zone, it is separated into a predominantly catalyst phase and a predominantly gas phase in any suitable manner (e.g., through the provision of a deflection baffle above the outlet of the conical reaction zone). The separated catalyst may be formed into an annular fluidized dense bed for efficient stripping or an additional quantity of feed stock may be injected into the annular dense bed to obtain additional conversion, or both. The feed stock injected into the annular fluidized bed may have a composition which is the same as or different from the composition of the feed stock introduced into the conical catalytic cracking zone. Preferably, the feed stock introduced into the conical disperse phase catalytic cracking zone will be a feed stock containing a substantial portion of easily cracked components (e.g., a virgin catalytic gas oil fraction) and the feed injected into the annular dense phase catalytic cracking zone will preferably contain a predominant amount of more refractory feed components (e.g., recycle gas oil fractions, coker gas oil fractions, etc.).

In accordance with one aspect of the present invention, the disperse phase fluidized catalytic cracking process is practiced in a conversion zone prepared by the inexpensive modification of an existing dense phase type fluidized catalytic conversion zone.

The invention will be further described with reference to the accompanying drawings wherein:

FIG. 1 is a schematic elevational view, in section, of a catalytic cracking unit constructed in accordance with the present invention; and FIG. 2 is a schematic elevational view, in section, of a fluidized catalytic cracking conversion zone constructed in accordance with the present invention and prepared by the modification of a conversion zone initially constructed for the dense bed catalytic cracking of petroleum hydrocarbons.

Turning now to FIG. 1, there is shown one embodiment of the present invention wherein there is provided a reaction zone having a conically diverging end segment 10 which, for example, in accordance with the embodiment shown in FIG. 1, may have a length-to-diameter ratio of about 6:1 to about 8:1. The diameter of the terminal segment 10 at the lower end thereof in commercial practice will be within the range of about 3 to 6 feet. The initial portion 12 of the conversion zone may be a comparatively small transfer line section of substantially uniform cross-section provided at the inlet end with a conduit 14 for the admission of regenerated fluidized cracking catalyst and with an inlet line 16 for the admission of a petroleum hydrocarbon gas oil fraction to be subjected to fluidized catalytic cracking operations. The length of the initial segment 12 of the conversion zone may be varied within comparatively wide limits in that the zone 12 is primarily a transportation zone for transporting catalysts and feed stock to the principal terminal conversion zone 12. Thus, for example, in commercial installations the length of the segment 12 may normally be such that from about 5 to 25 volume percent of the feed is converted, additional conversion of the feed stock components occurring in the zone 10. It is normally desirable to obtain an overall conversion of from about 40 to 70 volume percent of the feed stock and, as indicated, this degree of conversion is obtained within the zone 10. An inverted frusto-conical acceleration zone 18 is provided at the discharge end of the zone 10 for momentarily accelerating the suspension. A deceleration zone 20 is provided at the discharge end of the acceleration zone 18 for rapidly decelerating the catalyst and gaseous components by changing the direction of flow of the suspension by at least about 45°. As shown in the drawing, this is conveniently accomplished by providing an inverted cup-shaped member having a plurality of ports 22, the configuration of the cup-shaped member 20 being such that the velocity of the catalyst is reduced by about 30 to 60 percent. As a consequence, on passage through the ports 22 the cracking catalyst will tend to separate from hydrocarbon components under the influence of gravity and to flow downwardly from the ports 22.

A separation zone is provided above the conversion zone 10, such separation zone being defined by a pressure resistant shell member 24. A discharge conduit 26 is provided at the top of the shell member 24 for removing conversion products, the conduit 26 being fluidly interconnected with a manifold 28 within the separation zone for this purpose. A plurality of cyclone type separators 30—30 are provided within the separation zone for substantially completely removing entrained catalyst from the conversion products. Thus, conduits 32—32 interconnect the cyclones 30—30 with the manifold 28 for the discharge of gaseous components from the separation zone while dip legs 34—34 transport the separated catalyst from the separation zone.

In accordance with one aspect of the present invention, an auxiliary treating zone is provided annularly of the conversion zone 10, such auxiliary conversion zone being defined by wall members 38 and 40. In accordance with this showing, there is provided a terminal treating segment 42 intermediate the wall member 40 and the reactor 10 of substantially uniform cross-sectional area. Means are provided adjacent the bottom of the zone 42 for injecting a stripping medium, such as steam, such means comprising, for example, a steam injection ring 46. If desired, suitable means may be provided adjacent the top of the zone 42 for introducing a fluidizing medium such as additional feed stock or additional steam, such additional means, for example, comprising an injection ring 48. In accordance with this embodiment, there is provided a dense fluidized bed (i.e., dense phase) zone 50 intermediate the wall member 38 and the annular end of the reactor 10. In accordance with this modification, fluidized medium introduced by way of the injection ring 48 will countercurrently contact catalyst descending from the ports 22 of the deceleration zone 20. The amount of fluidizing medium introduced should be sufficient to provide for the maintenance of a dense fluidized bed above the injection ring 48. The surface of the dense bed 52 may be varied in height with respect to injection ring 48 for a constant catalyst charge rate by regulation of the quantity of fluidization medium introduced through the injection ring 48 in the manner known to those skilled in the art.

The stripping zone 42 is preferably provided with baffles, schematically illustrated by the numeral 54 to provide for efficient stripping of the descending catalyst. A particularly suitable baffle type of arrangement is that shown in copending Roquemore application Ser. No. 693,755, filed October 31, 1957, now U.S. Patent No. 2,917,373. A discharge port 56 is provided at the bottom of the zone 42 for removing spent catalyst from the conversion area and for transporting the same to a suitable regeneration zone (not shown).

In FIG. 2 of the drawings, there is shown another form of the present invention illustrating the manner in which a conventional fixed bed type of catalytic cracking unit may be converted to a disperse phase type cracking unit of the present invention.

In the embodiment of the invention shown in FIG. 2, there is provided an elongate pressure resistant shell 100 having a tubular wall member 102 coaxially mounted therein and spaced therefrom to define an annular stripping zone 104. A discharge conduit 106 is provided at the top of the shell 100 for removing gaseous material, the conduit 106 being fluidly interconnected with a manifold 108 within the shell and at the top thereof. A plurality of cyclone separators 110–112 are provided for separating entrained catalyst from gaseous materials, for delivery of the gaseous materials to the manifold 108, and for removal of spent catalyst from the separation zone by way of dip legs 114 and 116. Disposed within the tubular member 102 adjacent the lower end thereof is a conventional pan 118 and, above the pan 118, a perforate grid member 120. A discharge conduit 122 is provided at the bottom of the shell 100 for removing spent catalyst and for transporting the same to a regeneration zone (not shown). A transfer line 124, constituting the inlet section of a disperse phase catalytic cracking zone, is provided for introducing vaporized feed and catalyst into the shell 100, the fresh catalyst and vaporized feed being introduced into the transfer line 124 in any suitable manner such as, for example, as shown in FIG. 1. Normally, the transfer line 124 terminates at the seal between the pan 118 and the transfer line 124. In accordance with the present invention, a conically diverging reactor segment 126 is provided which is extended upwardly from the pan 118 through the grid 120. In accordance with this embodiment, the conical member 126 may have a length-to-average diameter ratio within the range of about 4:1 to about 6:1. A zone of momentary acceleration 128 and a zone of deceleration 130 above the discharge end of the reactor segment 126 are defined by a bell member having a skirt portion 132 sealed to the grid 120. A steam injection ring 134 may be provided in the annular space intermediate the skirt 132 and the tubular member 102. An inlet line 136 controlled by any suitable means such as a valve 140 is fluidly interconnected with the steam injection ring 134 for regulating the admission of steam. A plurality of ports 138 in wall member 102 are provided above the steam ring 134 for the removal of spent catalyst into the stripping zone 104. The stripping zone 104 may contain a plurality of baffles (not shown) below the ports 138 for the efficient stripping of spent catalyst, such baffles, for example, being constructed in the manner disclosed and described in said aforesaid copending application Ser. No. 693,755. A primary steam injection ring 141 is provided at the bottom of the stripping zone 104 for the injection of steam or any other suitable stripping medium. In accordance with one embodiment of the present invention, there is also provided an injection ring 142 positioned exteriorly of the shell 100, the injection ring 142 being provided with a plurality of conduits 144 terminating in the annular space between the bell member 132 and the shell 102 in downwardly directed injection nozzles 146.

Suitable means, such as steam purge injection ring 148, are provided in the dead space 150 intermediate the pan 118 and the skirt 132 for equalizing pressure. The skirt member 132 is therefore provided adjacent the top thereof with a plurality of ports 152 for exhausting spent purge steam from the zone 150.

OPERATION

In conducting fluidized catalytic cracking operations in a reactor of the type shown in FIG. 1 of the drawings, a suitable regenerated finely divided cracking catalyst such as silica-alumina cracking catalyst is introduced by way of transfer line 12, together with preheated and partially or completely voltalized gas oil boiling range hydrocarbon feed stock. A particularly desirable catalyst may consist of about 75 to 85 weight percent of silica, and correspondingly, from about 25 to 15 weight percent of gamma alumina and may have a specific gravity within the range of about 1.6 to about 2.3. The feed stock may consist of a virgin gas oil fraction boiling within the range of about 600° to 1100° F. or may comprise a mixture of virgin gas oil feed stock and recycle hydrocarbons boiling within the gas oil boiling range.

A disperse phase suspension of cracking catalyst in a flowing stream of vaporized hydrocarbon feed stock is formed within the transfer line 12. The pressure head imposed upon the suspension of the transfer line 12 should be such that the suspension is transported through the line 12 with substantially piston-type displacement and velocities such that the superficial inlet velocity of the suspension at the inlet end of the conical reactor section 10 will be within the range of about 20 to 50 feet per second. As indicated, the length of the transfer line 12 will normally be such that only the most easily cracked 5 to 20 volume percent of the feed stock will be converted within the transfer line 12.

The fluidized suspension flows upwardly through the conical reactor section 10 at a progressively decreasing velocity, the length-to-average diameter ratio of the frustroconical section 10 and the angle of divergence being such that the superficial gas velocity at the exit thereof is within the range of about 8 to 15 feet per second. As indicated previously, the length-to-average diameter ratio will be within the range of about 4:1 to 8:1 and in the embodiment shown in FIG. 1, more preferably within the range of about 6:1 to 8:1. The angle of divergence will be within the range of about 2° to 5° and, in the embodiment shown in FIG. 1, more preferably in the range from about 2° to about 3½°.

Conversion conditions within the transfer line 12 and the terminal section 10 will preferably include a temperature within the range of about 800° to about 1100° F. and a pressure within the range of about 0 to 50 p.s.i.g. The amount of catalyst maintained in the disperse phase suspension should be sufficient to provide a ratio of from about 20 to about 300 pounds of feed per hour per pound of catalyst and the catalyst-to-oil ratio of the suspension should be within the range of about 2 to about 15 pounds of catalyst per pound of oil.

When hydrocarbon feed stocks are subjected to fluidized catalytic cracking in the above-described manner for a given percent of conversion of feed stock to high octane boiling range products, there is realized at least a reduced yield of residuum and a reduced yield of hydrogen.

As previously indicated, the suspension of gaseous material and fluidized catalyst is separated after flowing through the conical reactor segment 10 into a predominantly catalyst phase and a predominantly gas phase.

Gaseous components and entrained catalyst particles discharged through the ports 22 of the deceleration zone 20 are resolved in the cyclones 30—30 into a gaseous product discharged by way of conduits 32—32 and the manifold 28 through the discharge conduit 26.

Both the catalyst components separated under the influence of gravity and the catalyst components separated in the cyclones 30—30 are charged to the annular space intermediate the reactor segment 10 and the shell members 38 and 40. The thus-separated catalyst may be subjected directly to stripping operations within the annular space with a stripping medium such as steam introduced by way of the injection ring 46 in order to substantially completely remove hydrocarbon components from the spent catalyst prior to discharge of the spent catalyst to the outlet conduit 56.

Alternately, and more preferably, the catalyst is formed into an annular dense fluidized bed through the injection of a fluidizing medium through the ring 48. The fluidizing medium may be a stripping medium such as steam, in which case a more efficient stripping of the catalyst is obtained. Alternately, an additional quantity of feed stock (e.g., 5 to 20 volume percent of the total hydrocarbon feed to the unit) may be utilized as the fluidizing medium whereby additional conversion of feed stock will be obtained. However, since the above-described reductions in residuum yield and hydrogen yield are not obtainable by dense bed type cracking, the additional feed stock injected into the ring 48 should preferably be of a comparatively refractory nature. Examples of refractory materials include heavy highly aromatic recycle fractions, heavy gas oil boiling range fractions derived from thermal or fluid coking of gas oil boiling range hydrocarbons, etc.

It is advantageous to subject refractory fractions of the above-described nature to cracking in the annular bed in that such feed components, when utilized as feed components for disperse phase cracking, constitute marginal feed stock components which provide the least degree of improvement with respect to hydrogen and residuum yields.

Turning now to FIG. 2, catalytic cracking operations are conducted in the manner described above with respect to FIG. 1, the suspension of feed and fresh catalyst being introduced into the system by way of a transfer line 124 to provide for catalytic cracking of the feed stock within the transfer line 124 and the conical end section 126. The disperse phase suspension is resolved by momentarily increasing the superficial velocity of the suspension in the acceleration zone 128 and by immediately thereafter decreasing the velocity of the suspension in the deceleration zone 130. Gaseous products are recovered in the cyclones 110–112 for removal by way of the manifold 108 through the conduit 106. Spent catalyst is formed into a dense bed in the annular zone between the skirt 132 and the tubular member 102 either through the injection of steam through the steam ring 134 or through the injection of an additional quantity of feed stock through the injection nozzles 146, or both. Spent catalyst and entrained hydrocarbon components are discharged into the stripping zone 104 by way of the ports 138 in the tubular member 102. Additional stripping is accomplished in the zone 104 by means of a stripping medium introduced through the injection ring 141. Spent stripped catalyst is withdrawn by way of a bottom conduit 122 leading to a regeneration zone (not shown) of any suitable construction.

As an example of a preferred set of operating conditions to be employed with respect to a reactor of the type shown in FIG. 2, disperse phase cracking conditions may include a temperature within the range of about 900° to about 1000° F., a pressure within the range of about 20 to 35 p.s.i.g., a catalyst-to-oil ratio within the range of about 6 to about 8, and a w./hr./w. within the range of about 70:1 to about 200:1 to thereby provide for a conversion of from about 40 to about 70 percent of the feed stock. Superficial gas velocity at the inlet of the conical section 126 may be within the range of about 30 to 50 feet per second and the discharge velocity may be within the range of about 10 to 15 feet per second and the angle of change of direction of flow in the deceleration zone may be about 90°.

EXAMPLES

The present invention will be further illustrated by the following specific examples which are given by way of illustration and not intended as limitations on the scope of this invention.

DESCRIPTION OF REACTION VESSELS

The experimental results reported herein were obtained with a reaction vessel of the type illustrated in FIG. 2 of the drawings, such reaction vessel being a modified reaction vessel which had previously been used for the commercial catalytic cracking of gas oil boiling range hydrocarbons.

Prior to modification, the reaction zone contained a pan 118 (unperforated) and a grid 120 (perforated throughout). The suspension of fluidized catalyst in vaporized feed stock components was introduced into the pan 118 by inlet line 124 and thereafter formed into a dense bed of fluidized catalyst in the zone defined by the upper portion of tubular member 102 lying above the grid 120.

The commercial unit was thereafter modified as shown in FIG. 2, the conical reactor section having a length-to-average diameter ratio of about 4.67 to 1 and an angle of divergence of about 4°.

Example I

Comparative runs were made under substantially equivalent operating conditions to provide for about a 50 percent conversion of a feed stock having the composition set forth in Table I. In both instances it was found that not more than about 20 percent of the feed stock was converted in the line 124 and that the residence time of the feed stock in the line 124 varied from about 1 to 2 seconds. The conversion conditions employed are set forth in Table II and the results obtained are set forth in Table III.

TABLE I.—FEED STOCK INSPECTIONS

| Run No | B-82 | B-83 | B-84 | B-85 | B-86 |
|---|---|---|---|---|---|
| Gravity, °API | 25.0 | 25.9 | 25.0 | 25.8 | 26.5 |
| Aromatic Rings, Wt. Percent | 10.16 | 10.44 | 10.38 | 8.61 | 8.39 |
| Naphthene Rings, Wt. Percent | 34.6 | 32.9 | 35.4 | 32.8 | 32.2 |
| Normal Paraffin, Wt. Percent | 8.6 | 10.6 | 7.7 | 8.9 | 8.2 |
| Sulfur, Wt. Percent | 0.58 | 0.52 | 0.52 | 0.49 | 0.51 |
| Con. Carbon, Wt. Percent | 0.9 | 0.5 | 0.9 | 0.9 | 0.8 |
| Distillation: | | | | | |
| Percent off at 430° F | 2.7 | 4.2 | 1.8 | 3.0 | 2.7 |
| 20% off at, ° F | 622 | 583 | 582 | 580 | 559 |
| 80% off at, ° F | 967 | 965 | 978 | 1,040 | 1,022 |

TABLE II.—OPERATING CONDITIONS

| | Prior to Modification | | Subsequent to Modification | | |
|---|---|---|---|---|---|
| Run No | B-82 | B-83 | B-84 | B-85 | B-86 |
| Dense Phase: Gas Velocity, Ft/Sec | 2-3 | 2-3 | | | |
| Disperse Phase: | | | | | |
| Inlet Gas Velocity, Ft./Sec | | | 25-35 | 25-35 | 23-35 |
| Outlet Gas Velocity, Ft./Sec | | | 8-12 | 8-12 | 8-12 |
| Reactor Temp., ° F | 943 | 937 | 968 | 961 | 961 |
| Pressure, p.s.i.g | 28 | 28 | 25 | 26 | 26 |
| Feed Rate, w/hr./w | 27.2 | 24.9 | 58.3 | 54.7 | 59.7 |
| Cat. to Oil Ratio | 7.1 | 7.4 | 11.2 | 9.8 | 11.2 |

TABLE III.—RESULTS

| Run No | B-82 | B-83 | B-84 | B-85 | B-86 |
|---|---|---|---|---|---|
| 430° F. Conv., Percent of Fresh Feed | 51.96 | 51.77 | 50.82 | 50.47 | 51.32 |
| Product Yield, Wt. Percent of Feed: | | | | | |
| Hydrogen | 0.34 | 0.34 | 0.10 | 0.11 | 0.09 |
| $C_1$-$C_5$ | 23.47 | 23.30 | 23.17 | 22.82 | 24.49 |
| $C_5$-430° F | 38.47 | 38.44 | 38.27 | 39.13 | 38.98 |
| 430°-650° F | 27.79 | 29.05 | 29.19 | 28.53 | 28.67 |
| 650° F.+ | 20.47 | 18.37 | 20.04 | 20.37 | 21.23 |

When the results obtained prior and subsequent to modification are compared, it is to be noted that hydrogen production was materially reduced (e.g., about 60%) subsequent to modification.

While not shown in Table III, there was found to be an average reduction in the yield of 900° F.+ products in excess of 20 percent, based on fresh feed, subsequent to modification.

Example II

In a second experiment, the feed stock was converted in both the disperse phase conical reactor 126 and in the annular dense phase reaction zone intermediate the members 102 and 132 as shown in FIG. 2 of the drawing. The characteristics of the feed stocks employed in the runs are set forth in Table IV. The conversion conditions employed in the disperse phase reaction zone and the dense phase reaction zone are set forth in Table V, together with the percentage of the total fresh feed charged directly to the annular dense phase reaction zone by way of the feed injection line 142 (FIG. 2). The results obtained are set forth in Table VI.

TABLE IV.—FEED STOCK INSPECTIONS

| Run No | B-87 | B-88 | B-89 | B-90 |
|---|---|---|---|---|
| Gravity, °API | 26.9 | 26.7 | 26.1 | 26.0 |
| Aromatic Rings, Wt. Percent | 8.97 | 8.66 | 9.37 | 9.41 |
| Naphthene Rings, Wt. Percent | 32.6 | 32.4 | 34.0 | 34.1 |
| Normal Paraffins, Wt. Percent | 10.0 | 8.8 | 11.0 | 8.7 |
| Sulfur, Wt. Percent | 0.36 | 0.42 | .087 | 0.65 |
| Con. Carbon, Wt. Percent | 0.59 | 0.59 | 1.09 | 0.54 |
| Distillation: | | | | |
| Percent Off at 430° F | 3.0 | 3.0 | 3.0 | 3.0 |
| 20% off at, ° F | 571.6 | 579.5 | 581.1 | 627.6 |
| 80% off at, ° F | 939.6 | 990.7 | 944.5 | 1,069.4 |

TABLE V.—OPERATING CONDITIONS

| Run No | B-87 | B-88 | B-89 | B-90 |
|---|---|---|---|---|
| Disperse Phase: | | | | |
| Inlet Gas Velocity, Ft./Sec | 25-35 | 25-35 | 25-35 | 25-35 |
| Outlet Gas Velocity, Ft./Sec | 8-12 | 8-12 | 8-12 | 8-12 |
| Temperature, ° F | 976 | 971 | 942 | 958 |
| Feed Rate, w./hr./w | 1.58 | 1.60 | 0.81 | 0.73 |
| Annular Dense Phase: | | | | |
| Gas Velocity, Ft./Sec | 2-3 | 2-3 | 2-3 | 2-3 |
| Temperature, ° F | 947 | 943 | 951 | 944 |
| Feed Rate, w./hr./w | 51.0 | 51.3 | 54.2 | 52.5 |
| Pressure | 26.4 | 26.8 | 25.0 | 25.5 |
| Cat. to Oil Ratio (Total Feed) | 9.8 | 8.8 | 11.8 | 9.4 |
| Percent of Fresh Feed to Annular Dense Phase | 11.4 | 11.5 | 5.8 | 5.5 |

TABLE VI.—RESULTS

| Run No | B-87 | B-88 | B-89 | B-90 |
|---|---|---|---|---|
| 430° F. Conv., Percent (Total Feed) | 50.6 | 52.3 | 50.8 | 48.3 |
| Product Yield, Wt. Percent (Total Feed): | | | | |
| Hydrogen | 0.12 | 0.13 | 0.10 | 0.16 |
| $C_1$-$C_5$ Fraction | 25.2 | 25.5 | 23.6 | 23.6 |
| $C_5$-430° F | 36.9 | 37.1 | 38.4 | 35.3 |
| 430°-650° F | 29.2 | 29.8 | 28.5 | 30.1 |
| 650° F.+ | 19.6 | 18.4 | 20.3 | 20.6 |

From Table VI, it will be noted that there was again a material reduction in hydrogen yield as compared with runs B-82 and B-83 of Table III, supra. However, the results obtained with respect to hydrogen yield were not as favorable as the results obtained with respect to runs B-84, B-85, and B-86 (Table III). This is attributable to the larger hydrogen yield resulting from the catalytic cracking reactions conducted in the annular dense phase as compared with the reduced hydrogen yield obtainable by the catalytic cracking reactions conducted in the disperse phase. Although not reported in the table, there was again obtained a substantial reduction in the yield of material boiling above 950° F.

What is claimed is:

1. A method for catalytically cracking a petroleum hydrocarbon feed stock which comprises the steps of forming a disperse phase suspension of a finely divided cracking catalyst in a vaporized hydrocarbon feed stock at a temperature within the range of about 800° and 1100° F., flowing said suspension at a pressure within the range of about 0 to 50 p.s.i.g. upwardly through a conically diverging reaction zone having a length-to-average diameter ratio within the range of about 4:1 to about 8:1 and an angle of divergence of about 2° to 5° at an inlet superficial velocity within the range of about 20 to 50 feet per second and an outlet superficial gas velocity within the range of about 8 and 20 feet per second, maintaining a sufficient amount of catalyst in said suspension to provide in said reaction zone a weight ratio of feed per hour to catalyst within the range of about 20:1 to about 300:1 and a catalyst to oil ratio within the range of about 2:1 to 15:1 to catalytically crack said hydrocarbon feed stock to form desired hydrocarbon products, separating said hydrocarbon products from said catalyst by momentarily accelerating said suspension and then discharging said suspension only laterally and downwardly from the upper end of said conical reaction zone whereby said outlet superficial gas velocity is rapidly decelerated and the accelerated velocity of the catalyst is reduced by about 30 to 60 percent, collecting said separated catalyst exteriorly of said conical reaction zone, and thereafter injecting an additional quantity of vaporized hydrocarbon feed stock into said collected catalyst in an amount sufficient to form a dense phase suspension of said collected catalyst in said additionally injected feed stock to catalytically crack at least a portion of said additionally injected hydrocarbon feed stock.

2. A method for catalytically cracking a petroleum hydrocarbon virgin gas oil feed stock fraction and a more refractory recycle gas oil fraction which comprises the steps of vaporizing said virgin gas oil feed stock and suspending therein a finely divided cracking catalyst under conditions to form a disperse phase suspension of said catalyst in said vaporized virgin gas oil fraction at a temperature within the range of about 800° to about 1100° F., flowing said disperse phase suspension at a pressure within the range of about 0 to 50 p.s.i.g. upwardly through a conically diverging reaction zone having an angle of divergence of about 2° to 5° and a length-to-average diameter ratio within the range of about 4:1 to about 8:1 at an inlet superficial velocity within the range of about 20 to 50 feet per second and an outlet superficial gas velocity within the range of about 8 and 20 feet per second, maintaining a sufficient amount of catalyst in said suspension to provide in said reaction zone a weight ratio of feed per hour to catalyst within the range of about 20:1 to about 300:1 and a catalyst to oil ratio within the range of about 2:1 to 15:1 to catalytically crack said hydrocarbon feed stock to form desired hydrocarbon products, separating said hydrocarbon products from said catalyst by momentarily accelerating said suspension and then discharging said suspension only laterally and downwardly from the upper end of said conical reaction zone whereby said outlet superficial gas velocity is rapidly decelerated and the accelerated velocity of the catalyst is reduced by about 30 to 60 percent, collecting said separated catalyst exteriorly of said conical reaction zone, injecting said recycle gas oil fraction into said collected catalyst in an amount sufficient to form a dense phase suspension of said collected catalyst in said thus-injected recycle gas oil fraction to thereby catalytically crack at least a portion of said recycle gas oil fraction, and recovering hydrocarbon conversion products from said disperse phase and dense phase catalytic cracking operations.

3. A reactor comprising a closed shell, a single vertical upright upwardly diverging conical reaction section coaxially mounted in said shell and annularly spaced therefrom to provide an annulus intermediate said shell and said conical reaction section, said conical reaction section having an angle of divergence of 2° to 5° and a length-to-average diameter ratio within the range of about 4:1 and about 8:1 and a diameter at the bottom thereof within the range of about 3 feet to about 6 feet, a transfer line having a diameter substantially equal to the bottom diameter of said conical reaction section coaxially sealed to the bottom of said conical reaction section for introducing a fluidized suspension of finely divided solid in vapor into the bottom of said conical reaction section, means mounted in said shell immediately above said conical reaction section for separating finely divided solid from vapor and for delivering said separated solid to said annulus, feed injection means intermediate the upper and lower ends of said annulus for the injection of a reactant into said annulus in an amount sufficient to provide for dense phase fluidization of said thus delivered solid, gas injection means adjacent the bottom of said annulus for injecting a gaseous stripping material into said annulus, baffle means intermediate said feed injection means and said gas injection means for stripping vapors from said separated solid and means mounted on said shell below said gas injection means for removing catalysts from said shell.

4. A reactor comprising a closed tubular shell, a tubular partition member coaxially mounted in said shell and defining a first annulus intermediate said tubular partition member and said shell, said tubular partition member having circumferentially spaced ports intermediate the ends thereof, a single vertical upright upwardly diverging conical reaction section coaxially mounted in said tubular partition member, said conical reaction section having an angle of divergence of 2° to 5° and a length-to-average diameter ratio within the range of about 4:1 to about 8:1 and a diameter at the bottom thereof within the range of about 3 feet to about 6 feet, a transfer line having a diameter substantially equal to the bottom diameter of said conical reaction section coaxially sealed to the bottom of said conical reaction section and extending outwardly through said shell to provide a conduit for introducing a fluidized suspension of finely divided solid in vapor into the bottom of said conical reaction section, a bell member interconnecting the top of said conical reaction section with said tubular wall member below said ports and defining a second annulus between said tubular wall member and said bell member, means mounted in said shell immediately above the top of said conical reaction section for separating finely divided solid from vapor and for delivering said separated solid to said second annulus, feed injection means mounted in said second annulus above said ports for the injection of a reactant into said annulus in an amount sufficient to provide for dense phase fluidization of said finely divided solid delivered to said second annulus, gas injection means adjacent the bottom of said first annulus for injecting a gaseous stripping medium into said first annulus for stripping vapors from portions of said finely divided solid flowing from said second annulus through said ports into said first annulus, catalyst withdrawal means adjacent the bottom of said shell for removing stripped finely divided solid therefrom and vapor withdrawal means adjacent the top of said shell for removing vapors from said shell.

5. A reactor comprising a closed shell and a single vertical reactor coaxially extending into said shell and comprising at least a terminal upwardly diverging conical reaction section terminating in said shell, said terminal conical reaction section having an angle of divergence of 2° to 5° and a length-to-average diameter ratio within the range of about 4:1 to about 8:1, a transfer conduit having a diameter substantially equal to the bottom diameter of said conical reaction section sealed to the bottom of said reactor for introducing a fluidized suspension of finely divided solid in vapor into said reactor, acceleration means on the upper end of said conical reaction section and an inverted cup-shaped deceleration means closed on its upper end and having lateral ports forming the terminus of said acceleration means for separating solid from said suspension, means within said shell and exterior to and immediately above said conical reaction section for separating entrained solid from vapor, means adjacent the top of said shell for removing said separated vapor from said shell, said shell providing with its inner wall an annular section exterior to said conical reaction section and an annular terminal treating section below said annular section, said separation means above said conical reaction section and said deceleration means delivering separated solid to said annular section, the lower end of said annular section being in fluid communication with the upper end of said terminal treating section, means for injecting fluid into the bottom of said annular section, means for injecting stripping medium into the bottom of said terminal treating section, and means adjacent the bottom of said shell for removing said separated solid from said terminal treating section.

6. A reactor comprising a closed shell, a single vertical tubular reactor coaxially extending into said shell and comprising at least a terminal upright upwardly diverging conical reaction section coaxially mounted in said shell and annularly spaced therefrom to thereby provide an annulus intermediate said shell and said conical reaction section, said conical reaction section having a length-to-average diameter ratio within the range of about 4:1 to about 8:1 and an angle of divergence within the range of about 2° to about 5°, a transfer conduit having a diameter substantially equal to the bottom diameter of said conical reaction section coaxially sealed to the bottom of said reactor for introducing a fluidized suspension of finely divided solid in vapor into the bottom of said reactor, acceleration means on the upper end of said conical reaction section and an inverted cup-shaped deceleration means closed on its upper end and having lateral ports forming the terminus of said acceleration means for separating solid from said suspension and for delivering said separated solid to said annulus, means mounted in said shell immediately above said conical reaction section for separating finely divided entrained solid from vapor and for delivering said separated solid to said annulus, means adjacent the top of said shell for removing said separated vapor from said shell, injection means mounted in said annulus for injecting gaseous material into the bottom of said annulus, an annular terminal treating section in said shell below said annulus, baffle members in said terminal treating section, means for injecting stripping medium into the bottom of said terminal treating section, and means connected to said shell communicating with the lower end of said terminal treating section for removing finely divided solid from said terminal treating section.

7. A method for catalytically cracking a petroleum hydrocarbon feed stock which comprises the steps of forming a disperse phase suspension of a finely divided cracking catalyst in a vaporized hydrocarbon feed stock at a temperature within the range of about 800° to 1100° F., flowing said suspension at a pressure within the range of about 0 to 50 p.s.i.g. upwardly through a conically diverging reaction zone having a length-to-average diameter ratio within the range of about 4:1 to about 8:1 and an angle of divergence of about 2° to about 5° at an inlet gas superficial velocity within the range of about 20 to 50 feet per second and an outlet superficial gas velocity within the range of about 8 to 20 feet per second, maintaining a sufficient amount of catalyst in said suspension to provide in said reaction zone a weight ratio of feed per hour to catalyst within the range of about 20:1 to about 300:1 and a catalyst-to-oil ratio within the range of about 2:1 to about 15:1 to catalytically crack said hydrocarbon feed stock to form desired hydrocarbon products, momentarily accelerating said suspension, and then rapidly decelerating said outlet superficial gas velocity by discharging said suspension only laterally and downwardly from the upper end of said conical reaction zone to reduce the velocity of the catalyst by about 30 to 60 percent of the accelerated velocity, whereby said hydrocarbon products are separated immediately from said catalyst.

8. A method for catalytically cracking a petroleum hydrocarbon feed stock which comprises the steps of forming in a transfer line a disperse phase suspension of a finely divided cracking catalyst in a vaporized hydrocarbon feed stock at a temperature within the range of about 800° to 1100° F., flowing said suspension through said transfer line and thence upwardly through a conically diverging reaction zone having an angle of divergence of about 2° to about 5° and a length-to-average diameter ratio within the range of about 4:1 to about 8:1 under conversion conditions including said temperature, a pressure within the range of about 0 to 50 p.s.i.g., an inlet superficial gas velocity at the base of said conically diverging reaction zone within the range of about 20 to 50 feet per second and an outlet superficial gas velocity within the range of about 8 to 20 feet per second, maintaining a sufficient amount of catalyst in said suspension to provide in said reaction zone a weight ratio of feed per hour to catalyst within the range of about 20:1 to about 300:1 and a catalyst-to-oil ratio within the range of about 2:1 to about 15:1 to catalytically crack said hydrocarbon feed stock to form desired hydrocarbon products, momentarily accelerating said suspension, rapidly decelerating said outlet superficial gas velocity by discharging said suspension only laterally and downwardly from the upper end of said reaction zone to reduce the velocity of the catalyst by about 30 to 60 percent of the accelerated velocity, whereby said hydrocarbon products are separated immediately from said catalyst, the residence time of said suspension in said transfer line being regulated to provide a conversion of about 5 to 25 volume percent of said feed stock in said transfer line and the residence time of said suspension in said conically diverging reaction zone being sufficient to provide an additional conversion of from about 35 to about 45 volume percent of said feed stock.

References Cited in the file of this patent

UNITED STATES PATENTS

| | | |
|---|---|---|
| 2,445,328 | Keith | July 20, 1948 |
| 2,459,824 | Leffer | Jan. 25, 1949 |
| 2,740,752 | Anhorn | Apr. 3, 1956 |
| 2,849,384 | Voorhies et al. | Aug. 26, 1958 |
| 2,900,324 | Patton et al. | Aug. 18, 1959 |
| 2,900,325 | Rice et al. | Aug. 18, 1959 |
| 2,906,703 | Valle | Sept. 29, 1959 |

FOREIGN PATENTS

| | | |
|---|---|---|
| 513,947 | Great Britain | Oct. 26, 1939 |
| 1,119,834 | France | Apr. 9, 1956 |
| 767,312 | Great Britain | Jan. 20, 1957 |
| 775,590 | Great Britain | May 29, 1957 |